C. F. WALDMAN.
ELASTIC TIRE FOR VEHICLE WHEELS.
APPLICATION FILED AUG. 7, 1911.
1,023,344.
Patented Apr. 16, 1912.
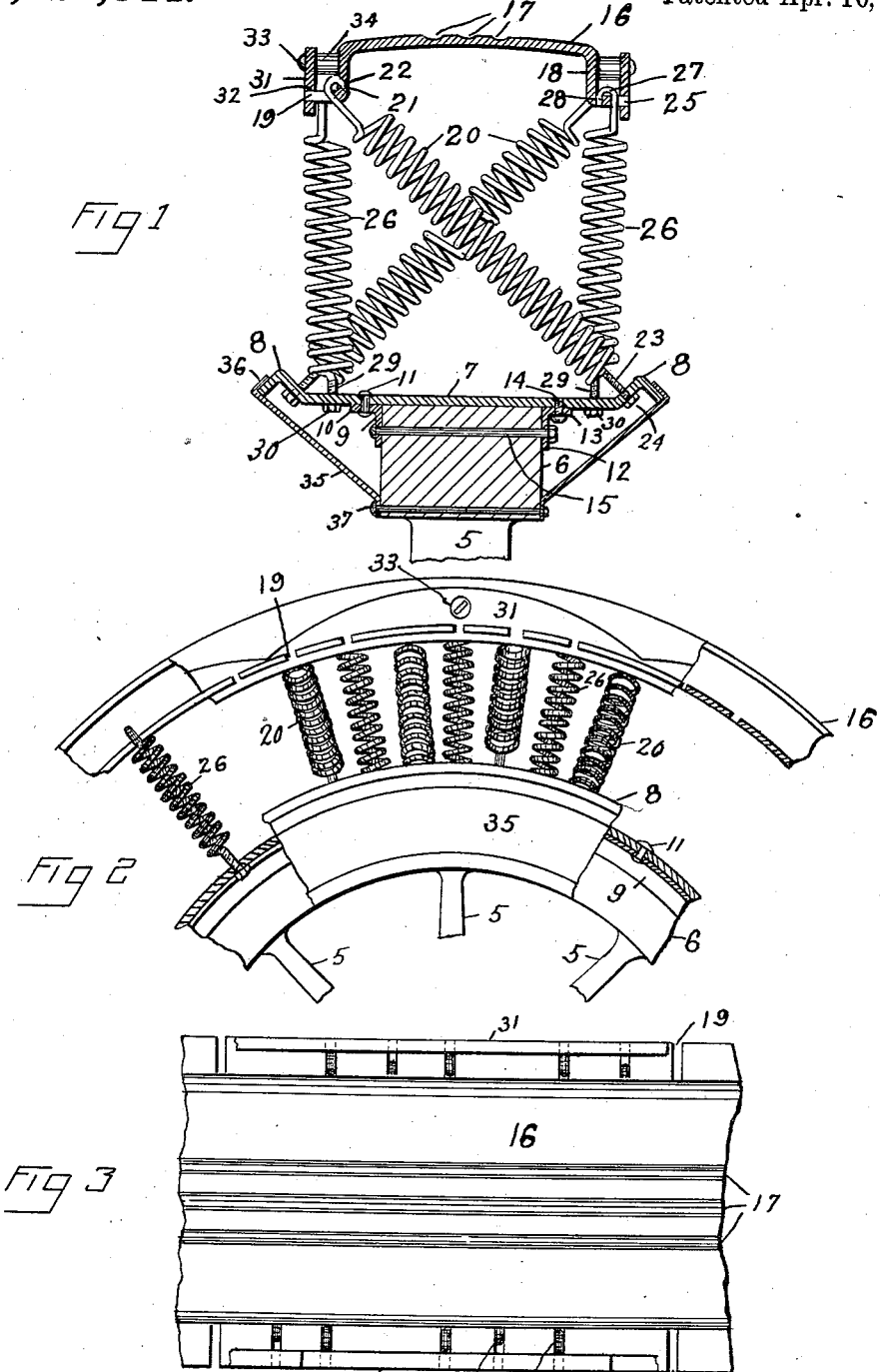

UNITED STATES PATENT OFFICE.

CHARLES F. WALDMAN, OF LOS ANGELES, CALIFORNIA.

ELASTIC TIRE FOR VEHICLE-WHEELS.

1,023,344.  Specification of Letters Patent.   Patented Apr. 16, 1912.

Application filed August 7, 1911. Serial No. 642,836.

*To all whom it may concern:*

Be it known that I, CHARLES F. WALDMAN, a citizen of the United States, residing in the city of Los Angeles, county of Los Angeles, and State of California, have invented new and useful Improvements in Elastic Tires for Vehicle-Wheels, of which the following is a specification.

The particular object of my invention is to provide a cheap, simple and efficient elastic tire and fastening means for the same so that it can be applied to a wheel without altering the construction thereof and be securely held against accidental displacement.

A further object is to provide means for quickly and easily removing and replacing any of the working parts that may be worn out or destroyed.

I accomplish these objects by means of the device described herein and illustrated in the accompanying drawings; in which:—

Figure 1 is a radial section of my improved tire and the felly to which it is secured. Fig. 2 is a side elevation of a portion of a vehicle wheel embodying my invention, with parts in section for clearness of illustration. Fig. 3 is a diagrammatic plan of a portion of the tire.

In the drawings 5 are the spokes and 6 the felly of an ordinary wheel. Mounted upon the periphery of the felly 6 is an annular ring 7 having its outer edges formed into inverted V-shaped troughs 8. At one side of the felly when positioned for use is an annular plate 9 having an externally projecting flange 10 which is rigidly secured to ring 7 by rivets 11. On the opposite side of the felly is a like annular plate 12 having an externally projecting flange 13. Plate 12 is cut into sections to facilitate assembling and repairs when needed. The various sections of plate 12 are secured to ring 7 after the same is positioned on the felly as shown in Fig. 1 by machine screws 14. Bolts 15 may also be used to connect plates 9 and 12 and to securely bind them to the felly.

An annular tread ring 16 surrounds ring 7 at a distance therefrom and is preferably provided with a plurality of anti-skidding grooves 17. Tread ring 16 is provided with inwardly projecting flanges 18, the lower ends of which are slitted and turned outwardly. In these slits 19 are received the upper ends of the side thrust springs 20 which ends preferably terminate in hooks 21. The extreme outer ends of hooks 21 are received in holes 22 in flanges 18. The other ends of springs 20 terminate in straight externally threaded members 23 which pass through holes in the sides of the troughs of ring 7 and are held in place by nuts 24 screwed thereon as best shown in Fig. 1. In the outwardly turned ends of the flanges 18 are other and less deep slits 25 in which last slits are received the upper ends of the main thrust springs 26 which ends preferably terminate in hooks 27. The extreme outer ends of hooks 27 are received in holes 28 in the outwardly turned portions of flanges 18. The other ends of springs 26 terminate in straight externally threaded members 29 which pass through holes in ring 7 and are held in place by nuts 30 screwed thereon as best shown in Fig. 1. These main thrust springs are evenly spaced around the whole circumference of ring 7 and are in pairs, one in each side, while the side thrust springs are intermediate the main thrust springs but are not in pairs. To protect and strengthen the outer ends of the flanges of the tread ring annular side skid plates 31 having openings 32 therein are provided. The outer ends of the flanges project into these openings and the plates are held fastened to the tread ring by bolts 33. Spacing washers 34 on bolts 33 keep the plates properly spaced. The outer edges of these side skid plates are preferably scalloped as best shown in Fig. 2. These edges are scalloped so that the wheel will not skid too far down a rail when crossing a railway track or other like structure like a rail.

In this construction the nuts on the inner ends of the springs provide means to tension the springs to any desired tension. Sectional dust plates 35 having upwardly projecting flanges 36 are secured to the felly by bolts 37. The flanges of these plates pass over the outer edge of ring 7 and thereby keep the dirt from contacting with the nuts on the ends of the springs. The tread rings of the wheels of the vehicle and the springs secured thereto support the weight of the other parts of the vehicle and its load. The springs suspend the main portion of the vehicle in the tread ring and as they give or vibrate when the tread ring passes over any obstruction a very easy riding vehicle is produced thereby. As the tread ring is of steel the cost of manufacture is not great and it will last a very long time. Should a spring break a new one can be easily put in.

Having described my invention what I claim is:—

1. An elastic tire comprising inner and outer circular bands; radial edge springs arranged in pairs and connected to said bands at the outer edges thereof; springs connected to the outer edges of said bands and extending diagonally in radial planes between the edge springs, there being two diagonal springs reversely inclined between the adjacent pairs of edge springs; and means to secure the inner ring to the felly.

2. An elastic tire comprising an inner circular band having its edges formed into inverted V-shaped troughs, said band having holes therein as described; an outer tread band having at the edges thereof flanges that first project inwardly and then laterally, the laterally turned portions being slitted; radial edge springs arranged in pairs having their outer ends formed into hooks adapted to engage the flanges of the outer bands by being passed into the slots thereof, and having their inner ends threaded and adapted to pass through holes in the inner band; nuts on the inner ends of said springs; reversely inclined diagonal springs having ends like the edge springs and adapted to be secured to said bands in like manner, there being two of such springs between the adjacent pairs of edge springs; scalloped annular side plates having openings therein into which the outer edge of the outwardly turned portion of the flange of the tread plate is received; bolts uniting said plates and flanges; spacing washers on said bolts; and means to secure said inner band upon the felly of a wheel.

In witness that I claim the foregoing I have hereunto subscribed my name this 31st day of July, 1911.

CHARLES F. WALDMAN.

Witnesses:
G. E. HARPHAM,
FRANK WATERFIELD.

---

Copies of this patent may be obtained for five cents each, by addressing the "Commissioner of Patents, Washington, D. C."